United States Patent [19]

Rossoll et al.

[11] Patent Number: 5,089,027
[45] Date of Patent: Feb. 18, 1992

[54] METHOD FOR PRODUCING A SOLID ELECTROLYTE CELL

[75] Inventors: Mary P. Rossoll, Willoughby; Alan J. Revilock, Middleburgh Heights, both of Ohio

[73] Assignee: Gould Inc., Eastlake, Ohio

[21] Appl. No.: 617,993

[22] Filed: Nov. 26, 1990

[51] Int. Cl.$^5$ ............................................. H01M 6/00
[52] U.S. Cl. .................. 29/623.2; 29/623.4; 29/623.5
[58] Field of Search ................ 29/623.2, 623.4, 623.5, 29/623.1; 429/162, 192

[56] References Cited

U.S. PATENT DOCUMENTS

| | | | |
|---|---|---|---|
| 3,563,805 | 2/1969 | Deierhoi | 429/162 |
| 4,172,319 | 10/1979 | Bloom et al. | 429/162 |
| 4,740,433 | 4/1988 | Lu | 429/194 |
| 4,818,644 | 4/1989 | Armand | 429/192 |
| 4,822,701 | 4/1989 | Ballard et al. | 429/192 |
| 4,956,247 | 9/1990 | Miyazaki et al. | 429/194 |
| 4,970,012 | 11/1990 | Kuroda et al. | 429/192 |

FOREIGN PATENT DOCUMENTS 88300869 8/1988 European Pat. Off.

Primary Examiner—Anthony Skapars
Attorney, Agent, or Firm—Michael A. Centanni

[57] ABSTRACT

A method for producing a solid electrolyte cell employing a poly(ethylene oxide) plus EC/PC-containing cathode; a poly(ethylene oxide) plus EC/PC-containing solid electrolyte separator and an anode strip, such as lithium, sandwiched between current collector sheets, such as cooper sheets, that are sealed at their peripheral area by an adhesive coated frame.

15 Claims, 1 Drawing Sheet

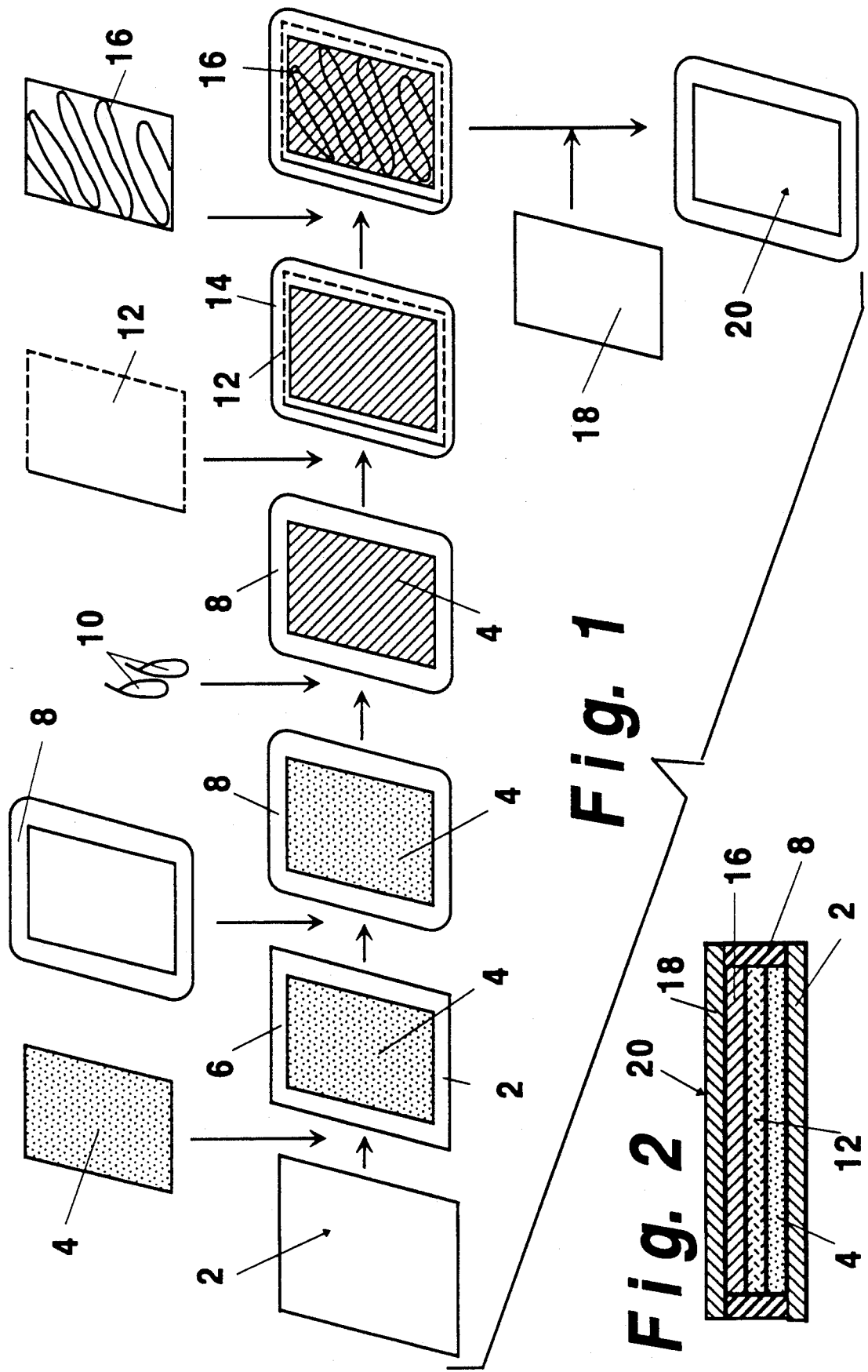

METHOD FOR PRODUCING A SOLID ELECTROLYTE CELL

FIELD OF THE INVENTION

The invention relates to a method for producing a solid electrolyte cell, specifically a flat solid electrolyte cell.

BACKGROUND OF THE INVENTION

Ionic conductivity is commonly associated with the flow of ions through a liquid solution of salts. In the vast majority of practical uses of ionic conductors, i.e., as electrolytes for dry cell and sealed lead acid batteries, the liquid solution is immobilized in the form of a paste or gelled matrix or is absorbed in a separator to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the use of a large volume of immobilizing material has hindered the aims of miniaturization and lowers the output capacity.

Improved microelectronic circuit designs have generally decreased the current requirements for electronic devices. This in turn has enhanced the applicability of solid electrolyte power sources which usually can deliver currents only in the microampere range. These solid electrolyte systems have the inherent advantages of being free of electrolyte leakage, corrosion and internal gassing problems due to the absence of a liquid phase. In addition, they also have a much longer shelf life than the conventional liquid electrolyte power sources.

In attempting to avoid the shortcomings of liquid systems, investigators have surveyed a large number of solid compounds seeking to find compounds which are solid at room temperature and have specific conductances approaching those exhibited by the commonly used liquid systems. Solid electrolytes must be essentially electronic insulators so as not to internally short the cell while at the same time they must allow for ionic migration if the cell is to operate properly. There are many solid state electrolytes "disclosed" in the art that can be used for solid state cells but many can only operate efficiently at higher temperatures, have low operating voltages or have internal high resistance.

It is an object of the present invention to provide a method for assembling a solid electrolyte cell, specifically a flat solid electrolyte cell.

It is another object of the present invention to provide a method for assembling a solid electrolyte cell employing a solid electrolyte film containing poly(ethylene oxide) or a poly(ethylene oxide) type polymer in conjunction with ethylene carbonate and propylene carbonate.

It is another object of the present invention to provide a method for assembling a solid electrolyte cell employing an active cathode film containing poly(ethylene oxide) in conjunction with ethylene carbonate and propylene carbonate.

The foregoing and additional objects will become more fully apparent from the following description and drawing.

SUMMARY OF THE INVENTION

The invention relates to a method for producing a solid electrolyte cell comprising the steps (a) depositing an active cathode material containing ethylene carbonate and propylene carbonate onto a first conductive current collector sheet and within an adhesive coated frame positioned at the peripheral area of the current collector sheet; (b) depositing on the cathode material propylene carbonate or ethylene carbonate and propylene carbonate and allowing said solution to be absorbed into the cathode material; (c) placing a separator strip onto the cathode material, said separator strip being smaller than the area of the cathode collector sheet and larger than the exposed area of the cathode material thereby leaving a portion of the adhesive coated frame area exposed; (d) placing an anode strip onto the separator and within the frame thereby leaving an exposed portion of the area of the adhesive coated frame; (e) placing a second conductive current collector substantially the size of the first conductive current collector onto the anode and exposed area of the adhesive coated frame; and (f) heating the cell assembly at a pressure and temperature for a period of time sufficient to secure the first current collector to the adhesive coated frame on one side and the opposite side of the adhesive coated frame to the second current collector thereby producing a sealed cell.

As used herein, the word strip means a film, foil or a composite that is spread out to produce a film on a substrate.

The solid electrolyte strip could be fabricated from a composition of poly(ethylene oxide), referred to hereinafter as PEO, along with a lithium salt, the anion of which may, for example, be $I-$, $Br-$, $ClO_4-$, $SCN-$, $BF_4-$, $PF_6-$ or $CF_3SO_3-$. Added to this composition is ethylene carbonate and propylene carbonate. It has been found that ethylene carbonate is better than propylene carbonate as an electrolyte solvent because it has a higher electric constant, but has the disadvantage, for use in a liquid system, that it is solid at room temperature. Thus, for solid electrolyte applications, ethylene carbonate would be the desired choice. However, it was discovered in copending application Ser. No. 421,085 filed Oct. 13, 1989 that the addition of propylene carbonate along with ethylene carbonate to a poly(ethylene oxide)-containing solid electrolyte will effectively lower the temperature at which the polymer undergoes a transition from an amorphous form to a crystalline form thereby substantially eliminating the presence of a crystalline form of the polymer at temperatures above about 20° C. This composition of a solid electrolyte is excellent for use in a solid electrolyte cell that can function at temperatures of about 20° C. and above.

The polymeric solid electrolyte film for use in this invention functions as a physical barrier between the anode and the cathode material, as well as, being ionically conductive at temperatures of 20° C. The preferred composition of the solid electrolyte separator would be PEO-70wt/%(3EC-1PC)$_{20}$ LiClO$_4$. The preferred preparation of the polymeric solid electrolyte would be as follows:

A desired quantity of ethylene carbonate is dissolved with propylene carbonate in a small beaker. The beaker is covered and set aside until the ethylene carbonate is dissolved completely. The beaker may be heated slightly (50° C.) to expedite the process. Dried poly(ethylene oxide) is combined in a high density polyethylene bottle containing ¾ inch diameter ceramic mixing balls with isopropyl alcohol. The solution along with a metal salt, ethylene carbonate, propylene carbonate, and a solvent can then be ball milled for a time period such as 30–45 minutes until a smooth viscous mixture is formed.

The polymeric electrolyte solution can then be cast onto a release paper such as a polyethylene coated release paper. The film is then allowed to dry for example about 2 hours. The film can then be transferred into a controlled temperature and humidity atmosphere (dry room) to complete the drying cycle. The material should have a moisture content less than about 30, preferably less than about 20 ppm $H_2O$ for battery use. Higher moisture levels result in a tacky film with poor mechanical properties. In addition, a latent reaction between the water and the salt (for example $LiClO_4$), the water and the lithium and/or the water and the solvent may also occur in a sealed cell if the water content is too high.

The molecular weight of the PEO can vary from 600,000 to 5,000,000. The proportions of the EC to PC could vary between 3.4 to 0.5 and 0.5 to 3.5. The amount of the PEO component of the solid electrolyte could vary from 30 to 50 weight percent. Suitable solvents for use in preparing the solid electrolyte could be acetonitrile, methanol, tetrahydrofurane (THF), isopropyl alcohol, dichloromethane and the like.

The cathode material for use in this invention can contain an active cathode material such as manganese dioxide ($MnO_2$), carbon monofluoride, vanadium pentoxide, metal chromate such as silver chromate and silver bismuth chromate and silver vanadium chromate; metal oxide such as nickel oxide, lead oxide, bismuth lead oxide and copper oxides; sulfides such as copper sulfides and iron sulfides; and cadmium. A carbonaceous material, if used, should preferably be carbon. The preferred carbonaceous material is acetylene or furnace black. The cathode material should also contain the same material as the electrolyte such as poly(ethylene oxide) with a lithium salt, the anion of which may, for example, be $I^-$, $Br^-$, $ClO_4^-$, $SCN^-$, $BF_4^-$, $PF_6^-$ or $CF_3SO_3^-$, along with ethylene carbonate and propylene carbonate. The solvent for the cathode could be methanol, trichloroethylene and the like. The preferred preparation of the cathode material would be the following.

A quantity of ethylene carbonate can be dissolved with propylene carbonate in a small beaker. The container could then be covered and set aside until the ethylene carbonate is completely dissolved. The beaker may be heated slightly (50° C.) to expedite the process. Pre-treated manganese dioxide and carbon could be mixed in their dry states in a high density polyethylene bottle with ¾ inch diameter ceramic mixing balls for one hour. Upon completion of the dry blend, a solvent such as methanol can be added. The mix can then be milled for about 1 hour. A second quantity of a solvent such as methanol and dried poly(ethylene oxide) can then be added slowly, alternating between small additions of liquid and dry materials, shaking vigorously between each combination. Next a salt such as a $LiClO_4$ salt can be added and the composition shaken once again. Finally, a second solvent, such as trichloroethylene, the dissolved EC/PC solution and a dispersant such as sorbitan monoleate, can be blended into the previous manganese dioxide-containing mixture and then can be milled for one hour. The composite can then be degassed and cast onto a coated release paper substrate such as polyethylene or directly onto a conductive current collector. The film can be allowed to dry for about 2 hours. The film can be transferred in a controlled temperature and humidity atmosphere (dry room) to complete the drying cycle. The material should have a moisture content less than about 30, preferably less than about 20 ppm $H_2O$ for cell use. Higher moisture levels result in a tacky film with poor mechanical properties. In addition, a latent reaction between the water and $LiClO_4$, the water and the lithium and/or the water and the solvent may also occur in a sealed cell if the water content is too high.

Additional EC and PC should be added to the cathode material prior to its assembly into a cell to replace any of the EC/PC that may have been lost during the drying step. Also additional EC/PC should be added to facilitate the proper orientation and location of the separator in the flat cell construction since the EC/PC will effectively prevent the separator from shifting since EC/PC will make the cathode material somewhat tacky.

The current collector for use in this invention could be copper, nickel, stainless steel or the like, with copper being the preferred current collector and more preferably the copper could be surface treated to enhance its affinity for adhesion to other materials such as the frame. For example, the copper could be electrodeposited so that the surface would be roughened. Preferably the thickness of the current collector for most applications could be from 0.0005 to 0.003 inch thick. The adhesive coated frame could be made of a plastic material such as polyester, polyethylene or the like. Any suitable adhesive can be employed as long as it can seal the current collectors together and provide at least a liquid tight seal. Some examples of an adhesive are ethylene vinyl acetate (EVA), polyethylene, ethylene acrylic acid (EAA), with EVA being the preferred adhesive.

The assembled cell should be heated under vacuum and pressure at the frame area to insure that the adhesive will firmly secure the current collectors to the frame. For most applications, the frame area of the cell assembly could be heated for about 125 to 200° C. under vacuum of at least 20 inches and at a pressure between 40 and 100 psig for as little as 3 seconds. Preferably, the cell assembly could be heated between about 170 to 175° C. at a pressure between 75 to 80 psig to properly seal the cell. If desired, the adhesive frame could be firmly secured to the first current collector and then the components of the cell could be assembled onto the current collector. The second current collector could be appropriately sealed to the frame during the final sealing procedure. Also, if desired, an adhesive could be deposited on only one side of the frame and then the adhesive coated side could be sealed to the first current collector. Thereafter, the same or different adhesive could be deposited on the exposed area of the frame and then secured to the second current collector.

The solid electrolyte cell may be encapsulated in various laminates to provide additional protection for the cell. However, if the cell is encapsulated in a film such as a polyamide or metalized polyethylene film, then provisions should be made so that electrical contact can be made from outside the cell to the current collectors of the cell. This could be accomplished by providing an opening in the film thereby exposing a selected area of each of the current collectors.

The present invention will become more apparent from the following description thereof when considered therein with the accompanying drawing which is set forth as being exemplary of an embodiment of the present invention and is not intended in any way to be limitative thereof.

BRIEF DESCRIPTION OF THE DRAWINGS

FIG. 1 is an exploded assembly view of a procedure for assembling a solid electrolyte flat cell of this invention.

FIG. 2 is a cross-sectional view of a solid electrolyte flat cell produced using the method of this invention as described in conjunction with FIG. 1.

FIG. 1 shows a first current collector plate 2 onto which is placed a cathode material 4. As shown, the surface area of the cathode material 4 is smaller than the surface area of current collector 2 thereby leaving a peripheral exposed area 6. A frame 8, having an adhesive coating on both sides, is disposed around cathode material 2 and contacts area 6 of current collector 2. If desired, the frame could be secured to the current collector by a heat treatment using impulse heating, ultrasonic heating or the like. To compensate for any loss of the EC/PC component in the cathode material 4, a suitable amount of EC/PC, preferably in droplet form 10, is deposited on top of cathode material 4. After the EC/PC solution 10 has been substantially absorbed into the cathode material 4, a solid electrolyte separator 12 is placed over cathode material 4. As shown in FIG. 1, separator 12 has a surface area larger than the surface area of cathode material 4 but smaller than the exposed area of frame 8 thus leaving an exposed area 14 of frame 8. An anode strip 16 such as a lithium foil, is then placed on top of separator 12. As shown in FIG. 1, lithium foil 16 has a surface area smaller than the surface area of separator 12. A top or second current collector 18 is placed over the lithium foil 16 and contacts the exposed peripheral area 14 of frame 8. This completes the assembly of a flat solid electrolyte cell 20 employing a PEO-EC/PC-containing solid electrolyte separator 12 and a PEO-EC/PC-containing cathode material 4.

FIG. 2 shows a cross-sectional view of the solid electrolyte cell 20 produced as described in conjunction with FIG. 1 and has identical components identified with the same reference numbers. Specifically, FIG. 2 shows a solid electrolyte cell 20 comprising a laminated structure of a cathode material 4, solid electrolyte separator 12 and anode strip 16 disposed between a first current collector 2 and a second current collector 18. The current collectors 2 and 18 are sealed at their peripheral areas by an adhesive coated frame 8. The overall assembled cell produced can be used to operate any electrical device designed to operate at a cell output potential. Although not shown, the cell could be encased in an enclosure such as a plastic enclosure having appropriate openings so that electrical contact could be made to both current collectors. The flat cell so produced occupies only a relatively small space and therefore can accommodate a variety of small battery operated devices. The cell can be fabricated with various output capacities and sizes to accommodate various size electrical devices.

EXAMPLE

A sample cell was made using the procedure as described in FIG. 1. The cathode material was made from a composition as follows:

40.0 grams of heat treated manganese dioxide
2.28 grams of heat treated carbon
23.36 grams of ethylene carbonate dissolved with 9.04 grams of propylene carbonate
4.0 grams of LiClO$_4$ salt
15.56 grams of poly(ethylene oxide) (PEO)
240 ml of methanol
320 ml of trichloroethylene of SPAN 80 which is a trademark for sorbitan monooleate of ICI, Atlas Chemical Division of United States The cathode material was made as described above and attached onto a copper current collector sheet using heat and pressure means. An adhesive frame was placed onto the copper current collector in which the cathode material was positioned within the frame.

Second drops of an ethylene carbonate and propylene carbonate mixture were applied to the exposed surface of the deposited manganese dioxide electrode contained within the adhesive frame. A thin piece of a solid electrolyte (separator) was placed on top of the manganese dioxide electrode within the adhesive frame. The composition of the solid electrolyte was:

21.60 grams of a complex of poly(ethylene oxide)
5.16 grams of a lithium salt, LiClO$_4$
37.80 grams of ethylene carbonate
12.60 grams of propylene carbonate
75 ml of isopropyl alcohol 1.5 mil thick piece of lithium was placed on top of the solid electrolyte, followed by a second sheet of copper approximately the same size as the copper current collector. The cell was placed under 80 psig pressure and heated to a temperature of about 175° C. so that the peripheral adhesive frame was sealed to the copper current collector thereby providing a sealed Li/MnO$_2$ cell. The cell was discharged across a 33K ohm load and the voltage observed with time is shown in Table 1. The open circuit voltage was 3.45 volts.

TABLE 1

| Li/MnO$_2$ Cell Discharge | |
|---|---|
| Time (hours) | Voltage (volts) |
| 0 (CCV) | 3.392 |
| 1 | 3.208 |
| 2 | 3.134 |
| 3 | 3.077 |
| 4 | 3.042 |
| 5 | 3.016 |
| 6 | 2.995 |
| 7 | 2.978 |
| 8 | 2.966 |
| 9 | 2.952 |
| 10 | 2.929 |
| 15 | 2.899 |
| 20 | 2.755 |
| 50 | 2.737 |
| 100 | 2.737 |
| 150 | 2.561 |
| 240 | 1.843 |

Two cells were connected in series in which one of the copper collectors was removed so that the cell formed a bipolar construction which provided a six volt battery. The battery discharged across a K load and the voltage observed with time is shown in Table 2.

TABLE 2

| Li/MnO$_2$ Battery Discharge | |
|---|---|
| Time (hours) | Voltage (volts) |
| 0 (CCV) | 6.56 |

TABLE 2-continued

Li/MnO₂ Battery Discharge

| Time (hours) | Voltage (volts) |
|---|---|
| 1 | 5.983 |
| 5 | 5.584 |
| 10 | 5.501 |
| 20 | 5.504 |
| 30 | 5.492 |
| 40 | 5.468 |
| 50 | 5.355 |
| 60 | 5.128 |
| 70 | 3.823 |
| 80 | 3.027 |

It is to be understood that modifications and changes to the preferred embodiment of the invention herein described can be made without departing from the spirit and scope of the invention. For example, bipolar batteries could be constructed of six or nine volts. For example, in FIG. 2 if two batteries were placed on top of each other with one of the current collectors removed, then a bipolar battery would be constructed consisting of a current collector 18, anode 16, separator 12, cathode 4, current collector 2, anode 16, separator 12, cathode 4 and current collector 2.

What is claimed:

1. A method for producing a cell comprising the steps:
   (a) depositing an active cathode material containing at least ethylene carbonate and propylene carbonate onto a first conductive current collector sheet and within an adhesive coated frame positioned at the peripheral area of the current collector sheet;
   (b) depositing on the cathode material propylene carbonate or ethylene carbonate and propylene carbonate and allowing said deposit to be absorbed into the cathode material
   (c) preparing a separator strip as follows:
      (a') dissolving ethylene carbonate in propylene carbonate to form a solution;
      (b') dissolving poly(ethylene oxide) in a solvent;
      (c') adding a metal salt and a solvent along with the solution of step (a') to the dissolved poly(ethylene oxide) solution of step (b') to form a mix and mixing the mixture to form a homogeneous mixture and drying said mixture to less than about 30 ppm water and then forming a separator strip from said mixture;
   (d) placing the separator strip onto the cathode material, said separator strip being smaller than the area of the cathode collector sheet and larger than the exposed area of the cathode material thereby leaving a portion of the adhesive coated frame area exposed;
   (e) placing an anode strip onto the separator and within the frame thereby leaving an exposed portion of the area of ht adhesive coated frame;
   (f) placing a second conductive current collector substantially the size of the first conductive current collector onto the anode and exposed area of the adhesive coated frame; and
   (g) heating at least the frame of the cell assembly at a pressure and temperature for a period of time sufficient to secure the first current collector to the adhesive coated frame on one side and the opposite side of the adhesive coated frame to the second current collector thereby producing a sealed cell.

2. The method of claim 1 wherein in step (a) the active cathode material is deposited onto the first current collector sheet and then the adhesive coated frame is positioned around said active cathode material and onto the peripheral area of the first current collector sheet.

3. The method of claim 1 wherein said first current collector and said second current collector is selected from the group consisting of copper, nickel and stainless steel.

4. The method of claim 3 wherein said first current collector and said second current collector are copper.

5. The method of claim 1 wherein said cathode material contains an active cathode material selected from the group consisting of manganese dioxide, iron sulfides, copper sulfides, silver chromates, lead oxides, bismuth oxides, copper oxides, nickel oxides, carbon monofluoride, vanadium oxide, silver vanadium chromate and cadmium.

6. The method of claim 5 wherein the active cathode material is manganese dioxide.

7. The method of claim 1 wherein the homogenous mixture is deposited onto a releasable sheet and dried to less than about 30 ppm water.

8. The method of claim 7 wherein the solvent in step (b') is isopropyl alcohol.

9. The method of claim 7 wherein the solvent is step (c') is acetonitfile.

10. The method of claim 7 wherein the separator film contains less than about 20 ppm water.

11. The method of claim 6 wherein the cathode material contains less than 30 ppm water 12. The method of claim 1 wherein in step (f) the cell assembly is heated at a temperature . between 170° C. to 175° C. at a pressure of between 75 psig to 80 psig to seal the first current collector and the second current collector to the adhesive frame thereby producing a sealed cell.

13. The method of claim 1 wherein the cell assembly is encased in a plastic film.

14. The method of claim 1 wherein the cathode material comprises manganese dioxide and carbon and the anode strip is lithium.

15. The method of claim 1 wherein the cathode material comprises vanadium oxide; and the anode strip is lithium.

* * * * *